Patented Nov. 4, 1952

2,616,851

UNITED STATES PATENT OFFICE 2,616,851

MINERAL OIL COMPOSITION CONTAINING ESTERS OF PRODUCT OBTAINED BY REACTION BETWEEN MALEIC ANHYDRIDE AND VINYL ACETATE

John J. Giammaria, Woodbury, N. J., assignor to Socony-Vacuum Oil Company, Incorporated, a corporation of New York No Drawing. Application April 29, 1947,
Serial No. 744,802

7 Claims. (Cl. 252—56)

1

This invention relates to improved lubricating oil compositions and, more particularly, to lubricating oil compositions improved by the addition of a small percentage, sufficient to improve the characteristics, of a reaction product of maleic anhydride and vinyl acetate, which reaction product has been esterified with a saturated aliphatic alcohol containing between about 12 and about 18 carbon atoms in a straight chain.

Prior to this invention, copolymers of vinyl acetate with various alpha, beta-unsaturated acids or anhydrides have been described in the literature and derivatives of these copolymers such as esters and amides have been mentioned. However, insofar as is known, it has never before been suggested that any of these derivatives are useful as addition agents for oil, or that they can be used to lower the pour point or improve the viscosity index of oils.

According to the present invention, it has been found that maleic anhydride will react with vinyl acetate to produce a copolymer, which copolymer is still capable of reacting with alcohols to form esters. When these esters are formed, using a saturated aliphatic alcohol having between about 12 and about 18 carbon atoms in a straight chain or a mixture of such alcohols, it has been found that the products are particularly useful as addition agents for mineral oils, in that they, very effectively, increase the viscosity index of the oil to which they are added. When the copolymers are esterified with a relatively pure aliphatic saturated alcohol, which falls within somewhat narrower limits, that is to say, not less than 14 nor more than 16 carbon atoms per molecule, it has been found that the products not only increase the viscosity index of mineral oils, but at the same time effectively lower the pour point thereof. Especially effective pour point depressants are obtained when the copolymer is esterified with a mixture of normal saturated alcohols containing an average of about 12 to 14 carbon atoms per molecule.

Thus, the preferred addition agents, in accordance with this invention, are prepared by reacting, in the presence of a peroxide, approximately equimolecular parts of maleic anhydride and vinyl acetate in a solvent such as dioxane, xylene, benzene, toluene, or carbon tetrachloride, and esterifying the copolymer with Eastman Kodak Company's "Technical lauryl alcohol" or E. I. du Pont de Nemours and Company's "Lorol B" or "Lorol 5," any of which contain the suitable mixture of alcohols mentioned hereinbefore. "Lorol B," for example, is a trade name used by

2

E. I. du Pont de Nemours and Company to designate a mixture of saturated aliphatic alcohols of which approximately 2.5% contain 10 carbon atoms to the molecule, 55% contain 12 carbon atoms to the molecule, 20.5% contain 14 carbon atoms to the molecule, 9% contain 16 carbon atoms to the molecule, and 13% contain 18 carbon atoms to the molecule. This represents an average chain length of 13.5 carbon atoms. The presence of minor percentages of branched chain alcohols, or even of unsaturated or cyclic alcohols, is not inimical to this invention, but is not generally to be desired. It has been found that other alpha, beta-unsaturated dicarboxylic acids and their anhydrides may be used in place of maleic anhydride, but in general they are not preferred because of their cost, and because in most cases, the products produced are not quite as effective as those produced from maleic anhydride. However, fumaric, itaconic, citraconic, glutaconic, mesaconic and aconitic acids and anhydrides may be used if desired.

Vinyl acetate is readily available and economical to use, and it is therefore preferred, but for it may be substituted other vinyl esters of aliphatic acids such, for example, as vinyl propionate, vinyl butyrate, vinyl laurate, vinyl myristate, etc.

The molecular weight of the copolymers formed in accordance with this invention may be varied by varying the nature or amount of any catalyst that may be used, the temperature, reaction time, or the solvent. The preferred conditions in these respects are illustrated by the examples, but it is to be understood that they can be varied to a considerable extent within the scope of this invention and without making the products ineffective for the intended purpose. In general, it is desirable that the copolymer have a fairly high molecular weight, as this appears to increase its effectiveness especially when the intended purpose is as a viscosity index improver.

As illustrative of the principles of this invention, a series of products has been prepared and certain of them incorporated in oil and tested for effectiveness as improvers of viscosity index and depressants of the pour point of oil.

EXAMPLE I

Maleic anhydride and freshly distilled vinyl acetate were reacted by dissolving 49.0 g. of maleic anhydride and 43.0 g. of freshly distilled vinyl acetate in 200 cc. of dioxane, adding 0.1 g. of benzoyl peroxide and heating the solution to reflux. As the reaction subsided, 0.9 g. more of benzoyl peroxide was added, the reaction became very vigorous, and the copolymer precipitated. The mixture was then cooled and the dioxane decanted. The copolymer was dissolved in acetone and reprecipitated by pouring the solution into benzene. It was then vacuum filtered and freed of solvent by heating to 80° C. for eight hours. The resultant copolymer was a fine white powder.

EXAMPLE II

Another copolymer of maleic anhydride and freshly distilled vinyl acetate was made by dissolving 49.0 g. of maleic anhydride and 21.0 g. of freshly distilled vinyl acetate in 180 cc. of dioxane and refluxing the solution at 100 to 105° C. for 3 hours with stirring. The solution was then cooled and the copolymer purified as described in Example I.

EXAMPLE III

Still another copolymer of maleic anhydride and freshly distilled vinyl acetate was prepared by dissolving 49 g. of maleic anhydride in 200 cc. of xylene, adding 215 g. of freshly distilled vinyl acetate and 1.0 g. of benzoyl peroxide and slowly heating the mixture with stirring until the reaction became exothermic. This occurred at about 95° C. at which point the heat was removed. The copolymer precipitated as a rather sticky, resinous mass which made stirring difficult. When the reaction had subsided, heat was again applied and the mixture refluxed for one hour. The supernatant liquid was decanted and the copolymer purified as described in Example I.

EXAMPLE IV

A copolymer of fumaric acid and freshly distilled vinyl acetate was prepared by stirring 58.0 g. of fumaric acid into 300 cc. of dioxane, adding 43.0 g. of freshly distilled vinyl acetate and 1.0 g. of benzoyl peroxide, slowly heating the mixture to 100° C. with stirring and holding the mixture at 100° C. for 5 hours. The solution was cooled and the copolymer precipitated by pouring into benzene. It was then vacuum filtered and heated on a steam bath to remove entrained solvent.

EXAMPLE V

An ester of the copolymer of Example I was prepared by suspending 25.0 g. of the copolymer of Example I in 100 cc. of xylene, adding 55.0 g. of Eastman technical grade lauryl alcohol and 0.5 g. of p-toluene sulphonic acid and heating at a temperature sufficient to reflux the xylene for several hours. The water formed in the reaction was collected in a suitable trap. The xylene was then gradually removed by raising the temperature to 165 to 175° C. This temperature was held until no more water was collected in the trap. The mixture was cooled, dissolved in benzene and washed several times with hot water. The solution was then filtered and the solvent distilled off. The ester was finally heated at 200° C. under 1 mm. of mercury pressure to distill off unreacted alcohol. The finished ester polymer was a soft, sticky resin which was soluble in lubricating oil.

EXAMPLE VI

An ester of the copolymer of Example I with tetradecanol-1 was prepared by suspending in 50 cc. of xylene, 2.0 g. of the copolymer of Example I, 10 g. of tetradecanol-1 and 0.25 g. of p-toluene sulphonic acid. Reaction was carried out in the same manner as in Example V.

EXAMPLE VII

An ester of the copolymer of Example II and Eastman technical lauryl alcohol was prepared by suspending in 100 cc. of xylene, 10 g. of the copolymer of Example II, 46.0 g. of technical lauryl alcohol and 3.0 g. of p-toluene sulphonic acid. The reaction was carried out in the same manner as in Example V.

EXAMPLE VIII

An ester of the copolymer of Example III was prepared by suspending in 100 cc. of xylene 10.0 g. of the copolymer of Example III, 46.0 g. of Eastman technical lauryl alcohol and 3.0 g. of p-toluene sulphonic acid. The reaction was carried out in the same manner as in Example V.

EXAMPLE IX

An ester of the copolymer of Example IV with Lorol-B, a mixture of alcohols described above, was prepared by dissolving in 100 cc. of dioxane, 15 g. of the copolymer of Example IV and 50 g. of Lorol-B. The solution was heated to remove the dioxane and form the half-ester of the copolymer. 100 cc. of xylene and 1.0 cc. of concentrated sulphuric acid were then added and the mixture heated at a temperature sufficient to reflux the xylene for four hours, the water from the reaction being collected in a suitable trap. The xylene and unreacted alcohols were then distilled off by topping at 250° C. under 1 mm. mercury of pressure.

The effectiveness of the copolymer esters of Examples V to IX as pour depressants is well illustrated by the data in the following table. These data are the result of a series of tests performed in the standard A. S. T. M. manner, using a solvent-refined, Mid-Continent type oil stock having a kinematic viscosity of 12.2 centistokes at 210° F. and an A. S. T. M. pour point of 20° F.

*Table I*

| Compounds Blended in Oil | Concentration Weight Percent | A. S. T. M. Pour Point, °F |
|---|---|---|
| Product of Example V | 0.125 | −25 |
| Do | 0.0625 | −15 |
| Product of Example VI | 0.125 | −20 |
| Do | 0.0625 | −15 |
| Product of Example VII | 0.125 | −25 |
| Do | 0.0625 | −10 |
| Product of Example VIII | 0.125 | −25 |
| Do | 0.0625 | −10 |
| Product of Example IX | 0.125 | −25 |
| Do | 0.0625 | −10 |

The following data are illustrative of the effect of the ester copolymers of this invention in increasing the viscosity index of lubricating oils. The results were obtained by incorporating the product of Example V in an acid-refined Mid-Continent type base oil, and the table shows a comparison of the oil before and after the product of Example V was incorporated in it.

*Table II*

| Compound Blended in Oil | Concentration, Weight Percent | Kinematic Viscosity | | Viscosity Index |
| | | 100° F. | 210° F. | |
|---|---|---|---|---|
| None | | 30.53 | 4.83 | 80.0 |
| Product of Example V | 1.0 | 31.83 | 5.01 | 86.7 |

As previously mentioned, the copolymers are preferably prepared from equimolecular proportions of maleic anhydride and vinyl acetate.

These proportions, however, may be varied between the approximate limits of 4 to 1 and 1 to 4. That is to say, as much as 4 molecular proportions of vinyl acetate may be used to one molecular proportion of maleic anhydride, or as much as 4 molecular proportions of maleic anhydride may be used to one molecular proportion of vinyl acetate.

No attempt has been made to identify the exact chemical structure of the compositions of this invention, but it has been found that for the most part, the ester copolymers of this invention have a viscosity of between 1.0 and 2.0 centistokes at 77° F. when blended into toluene in a proportion of 10% by weight of the ester copolymer to the mixture. Preferred copolymers of vinyl acetate with maleic anhydride have specific viscosities between 0.1 and 2.0 for 0.4% aqueous solutions at 68° F.

Although normal, saturated, aliphatic alcohols of 12 to 18 carbon atoms may be used in esterifying the copolymers to produce oil-soluble products which function as viscosity index improvers, it has been found that in the preparation of ester copolymers which also function as pour point depressants, it is necessary to make use of a more specific group of alcohols. Thus a product which functions both as a pour point depressant and a viscosity index improver is produced when the copolymers are esterified with relatively pure normal, saturated, aliphatic alcohols of 14 to 16 carbon atoms, or with a mixture of such alcohols having an average of about 12 to 14 carbon atoms per molecule.

In United States patent application, Serial Number 784,758, filed November 7, 1947, now abandoned, by John J. Giammaria, a series of compounds prepared by first esterifying an alpha, beta-unsaturated acid and thereafter polymerizing the ester with vinyl acetate are described. Although the same reactants enter into the composition made according to this process, the final products are quite different. This is to be expected, since there is a very considerable difference in the reaction rate between vinyl acetate and maleic anhydride and between vinyl acetate and a maleic acid ester. For example, a copolymer of vinyl acetate and dilauryl maleate, reacted in equimolecular proportions, is a viscous, tacky liquid which will flow at room temperature, whereas the product of Example V above, which is the lauryl ester of a copolymer of vinyl acetate and maleic anhydride, in which the maleic anhydride and vinyl acetate are reacted in equimolecular proportions, is a rather soft, rubbery resin which does not flow at room temperature. The effects of these two compositions in lubricating oil are quite different.

The concentration in which the ester copolymers of this invention are to be used in mineral oil will vary with the effect which it is desired to produce. In general, this invention contemplates the addition to lubricating oil of a minor proportion, sufficient to improve the properties of the oil of the addition agents described above. Usually, this proportion will fall between the limits of 0.01% and 2% when the purpose of the addition is to improve the pour point of the oil. As much as 10% may be added, however, when the improvement of viscosity index or other properties becomes an object.

It is contemplated that the oils improved in accordance with this invention may also be improved by the addition of other agents that affect its stability, detergency, extreme pressure lubricating qualities or even additionally affect its pour point or viscosity index. It is also contemplated that the new addition agents may be marketed as such, instead of dissolved in oil, or may be marketed as concentrates, that is to say, in relatively high concentrations in oil.

What is claimed is:

1. A mineral lubricating oil containing from about 0.01% to about 10% by weight of a reaction product formed by reacting vinyl acetate with an alpha, beta-unsaturated dicarboxylic acid anhydride, and esterifying the product of this reaction with a normal, saturated, aliphatic alcohol containing from about 12 to about 18 carbon atoms.

2. A mineral lubricating oil containing from about 0.01% to about 10% by weight of a reaction product formed by reacting vinyl acetate with an alpha, beta-unsaturated discarboxylic acid anhydride, and esterifying the product of this reaction with a normal, saturated, aliphatic alcohol containing from 14 to 16 carbon atoms.

3. A mineral lubricating oil containing from about 0.01% to about 10% by weight of a reaction product formed by reacting vinyl acetate with an alpha, beta-unsaturated dicarboxylic acid anhydride, and esterifying the product of this reaction with a mixture of normal, saturated, aliphatic alcohols having an average of about 12 to about 14 carbon atoms per molecule.

4. A mineral lubricating oil containing from about 0.01% to about 10% by weight of a reaction product formed by reacting vinyl acetate with maleic anhydride, and esterifying the product of this reaction with a normal, saturated, aliphatic alcohol containing from about 12 to about 18 carbon atoms.

5. A mineral lubricating oil containing from about 0.01% to about 10% by weight of a reaction product formed by reacting vinyl acetate with maleic anhydride, and esterifying the product of this reaction with a normal, saturated, aliphatic alcohol containing from 14 to 16 carbon atoms.

6. A mineral lubricating oil containing from about 0.01% to about 10% by weight of a reaction product formed by reacting vinyl acetate with maleic anhydride, and esterifying the product of this reaction with a mixture of normal, saturated, aliphatic alcohols having an average of about 12 to about 14 carbon atoms per molecule.

7. A mineral lubricating oil containing from about 0.01% to about 10% by weight of a reaction product formed by reacting vinyl acetate with maleic anhydride, and esterifying the product of this reaction with tetradecyl alcohol.

JOHN J. GIAMMARIA.

REFERENCES CITED

The following references are of record in the file of this patent:

UNITED STATES PATENTS

| Number | Name | Date |
| --- | --- | --- |
| 2,047,398 | Voss | July 14, 1936 |
| 2,091,627 | Bruson | Aug. 31, 1937 |
| 2,149,857 | Mikeska | Mar. 7, 1939 |
| 2,306,071 | McNally | Dec. 22, 1942 |
| 2,327,705 | Frolich | Aug. 24, 1943 |
| 2,366,517 | Gleason | Jan. 2, 1945 |
| 2,375,516 | Blair | May 8, 1945 |
| 2,422,881 | Blair | June 24, 1947 |
| 2,454,284 | Kirk | Nov. 23, 1948 |